United States Patent Office 2,933,534
Patented Apr. 19, 1960

2,933,534

SYNTHESIS OF VICINAL DIKETONES

Harry A. Stansbury, Jr., South Charleston, and Howard R. Guest, Charleston, W. Va., assignors to Union Carbide Corporation, a corporation of New York No Drawing. Application November 12, 1957
Serial No. 695,529

5 Claims. (Cl. 260—593)

This invention relates to a process for producing vicinal diketones. In a particular aspect, this invention relates to a method of synthesizing vicinal diketones from epoxy derivatives.

Organic compounds with vicinal diketone structures have long been known in synthetic chemistry as valuable reactive intermediates. These compounds, such as "biacetyl" (2,3-butanedione), have not achieved commercial importance in the chemical industry because they are not available by a practical synthesis which would make them economically feasible.

Because vicinal diketone compounds are such valuable synthetic intermediates, the chemical literature is replete with methods for producing them. One widely practiced synthetic method involves the nitrosation of appropriate ketone derivatives followed by hydrolysis:

(1) V. Peckman, Ber., 21, 1411 (1888); 24, 3954 (1891)

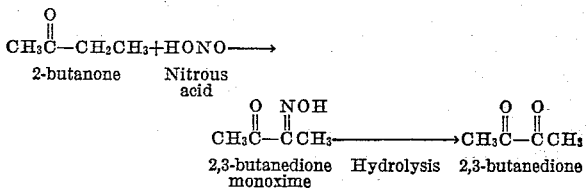

(2)

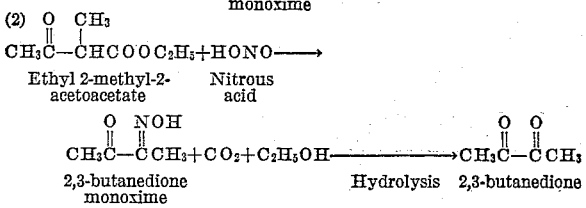

Oxidation reactions have also been widely studied as a means of synthesizing vicinal diketones:

(3) Weinkauff, U.S.P. 2,455,631 (1948)

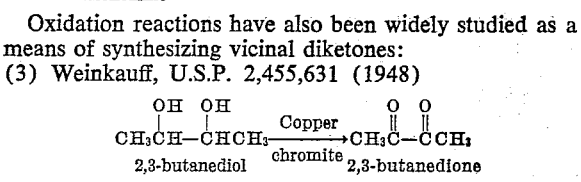

(4) Rust and Bell, U.S.P. 2,380,675 (1945)

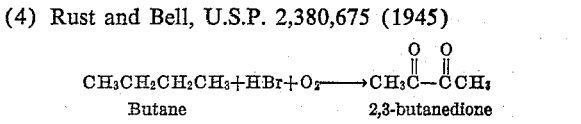

(5) Carter, U.S.P. 2,145,388 (1939)

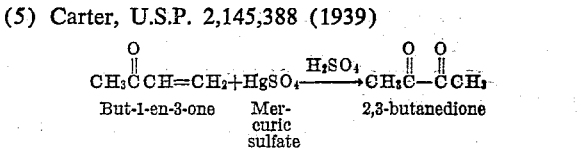

Eberhardt and Lieseberg, U.S.P. 2,110,699 (1938), convert an acetylene derivative to a vicinal diketone by hydrolysis in the presence of mercuric salts in sulfuric acid:

(6)

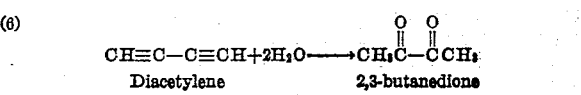

The known methods of synthesizing vicinal diketones are generally not satisfactory for commercial application because of low yields and efficiencies, or limited availability of required intermediates, or the formation of complicated product mixtures.

It is an object of this invention to provide a new method of synthesizing vicinal diketone compounds.

It is another object of this invention to provide a process for producing vicinal diketone compounds which is practical and economical and amenable to commercial application.

It is a further object of this invention to provide a method of synthesizing vicinal diketone compounds which operates under relatively mild conditions and affords high yields of recoverable product.

It is a particular object of this invention to provide a new and excellent method of synthesizing 2,3-butanedione ("biacetyl").

Various other objects and advantages of the present invention will become apparent to those skilled in the art from the accompanying description and disclosure.

Accordingly, the above objects are accomplished by a novel method which comprises treating under hydrolytic conditions in the presence of acid an epoxy compound having the formula:

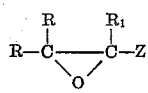

wherein R is selected from the group comprising hydrogen, alkyl and aryl; $R_1$ is selected from the group consisting of aliphatic, alicyclic and mononuclear aromatic substituents; and Z is selected from the group consisting of:

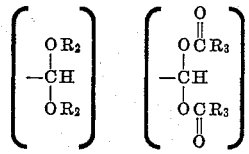

and

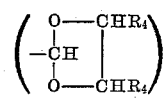

wherein $R_2$ is alkyl, $R_3$ is lower alkyl, and $R_4$ is from the group consisting of hydrogen and lower alkyl.

In the preferred compounds having the above formula, R is phenyl or a lower alkyl having between 1 and 10 carbon atoms; $R_1$ is phenyl or a lower alkyl having from 1 to 10 carbon atoms; $R_3$ is a lower alkyl having between 1 and 6 carbon atoms; $R_4$ is hydrogen or methyl; and preferably, both of said $R_2$ groups are the same, and both of said $R_3$ groups are the same.

Conversion of the above-described alpha-substituted epoxyaldehyde acetals and acylals to corresponding vicinal diketones in the presence of water and acid is believed to involve hydrolysis and a rearrangement of the carbon skeleton via a 1,2-shift of the $R_1$ substituent from the alpha carbon atom to the carbon atom of the carbonyl group:

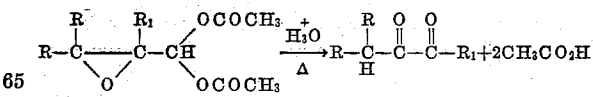

The epoxyaldehyde acetals and acylals starting materials useful in this invention may be conveniently prepared by epoxidation of 2-alkene-1,1-diol derivatives corresponding to the formula:

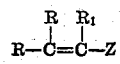

wherein R, R₁ and Z are the same as the respective groups in the previously described epoxyaldehyde acetal and acylal formula. The general reaction proceeds thusly:

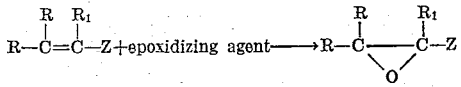

Typical epoxidizing agents are the peracids, e.g., peracetic acid, perbenzoic acid, pertrifluoroacetic acid and the like, and the aldehyde monoperacylates, e.g., acetaldehyde monoperacetate and propionaldehyde monoperpropionate. Of these epoxidizing agents the 2 to 3 carbon aliphatic peracids, particularly peracetic acid, and the 2 to 3 carbon aliphatic aldehyde mono-(2 to 3 carbon aliphatic)-peracylates, particularly acetaldehyde monoperacetate, are preferred mainly from the aspects of being commercially available and capable of producing commercially acceptable yields.

The epoxidation is advantageously carried out at temperatures in the range of —10° to 100° C. At temperatures below this range, epoxidation takes place at a very slow rate and above this range side reactions produce undesirable materials and reduce the yield.

The olefinic compounds that can be epoxidized to produce the epoxyaldehyde acetals and acylals starting materials of this invention, may be prepared by any suitable method known in the art. An advantageous method involves the reaction of the corresponding alpha, beta-unsaturated aldehydes with suitable alcohols, such as ethyl alcohol and ethylene glycol, in the presence of acid to produce acetal derivatives, and the reaction of the unsaturated aldehydes with suitable acid anhydrides, such as acetic anhydride and butyric anhydride, in the presence of acid to produce acylal derivatives. Examples of unsaturated aldehydes which may be converted to the acetal and acylal starting materials of this invention are 2-methylacrolein; 2-ethylacrolein; 2-ethyl-crotonaldehyde; 2-ethyl-3-propylacrolein; 2-phenylacrolein; 2,3-diphenylacrolein; 2-methylcrotonaldehyde; 2-propylacrolein; 2-isobutylacrolein; 2-cyclohexylacrolein; 2-cyclopentenecarboxaldehyde; 2-cyclohexenecarboxaldehyde; etc.

In the simplest embodiment of this invention, it is only necessary to mix the epoxyaldehyde acetal or acylal, which is to be converted to the corresponding vicinal diketone, with aqueous acid and heat to a suitable reaction temperature. The temperature most suitable for a particular mixture of epoxyaldehyde and aqueous acid will depend on the reactivity of the epoxyaldehyde and the strength and quantity of the acid catalyst present. Generally, the epoxyaldehyde derivatives which may be converted to vicinal diketones by the methods of this invention will yield the desired products when reacted at temperatures in the range between 50° and 280° C. Most of the chemical transformation to vicinal diketones will occur in good yields and at practical reaction rates, when the epoxyaldehyde starting materials are heated at temperatures in the range between 75° and 125° C. Ordinarily, simple refluxing of the aqueous mixture allows the reaction to proceed at a practical rate to yield vicinal diketone product.

The successful hydrolysis and rearrangement of epoxyaldehyde material by the method of this invention is dependent on the presence of water and acid in the reaction mixture. The acid need only be present in a minute quantity in order for chemical transformation of material to occur. However, if too little acid is used or if the acid is a weak acid such as acetic acid, then the reaction proceeds at a slow rate and with a low efficiency. Strong acids such as p-toluenesulfonic acid, trifluoroacetic acid and mineral acids are the preferred catalysts because they give optimum results in most cases. The aqueous acid solutions preferred are those which contain between one and fifty percent acid. The amount of aqueous acid solution mixed with epoxyaldehyde starting material will usually vary from approximately an equal quantity by weight of acid solution relative to the said epoxyaldehyde to a several-fold excess of acid solution.

As mentioned previously, in the practice of the invention the presence of water and acid is required. It will be noted that with acylal derivatives of epoxyaldehydes it is possible to mix said derivatives with plain water and have the reaction proceed satisfactorily because hydrolysis of said derivatives causes acid to be generated in situ. For example, hydrolysis of 2,3-epoxy-2-methylpropane-1,1-diol diacetate yields two moles of acetic acid. In some cases, even acetal derivatives may be forced to yield vicinal diketones under more severe conditions if the alcohol moiety generated in situ by hydrolysis is slightly acidic in nature. It is understood that the addition of a quantity of strong acid to the reaction mixture is preferred for optimum results.

The diketone product may be separated from the reaction mixture by any suitable means. When the reaction is conducted under reflux conditions, in most cases it is only necessary to allow the reflux stream to pass through a decanter for convenient separation of a product layer. This method of refluxing through a decanter is particularly amenable to continuous operation.

When reactions are to be conducted at temperatures higher than reflux temperature, or at pressures greater than atmospheric pressure, then the use of closed reaction systems is required, e.g., rocker bombs and the like. In these systems, autogenous pressures are preferred, but pressures up to 1000 p.s.i.g. are practical and applicable.

The reaction time will necessarily depend on the kinds and amounts of reactants involved, and on the reaction conditions. A reaction time of between one-half hour and five hours' duration will generally suffice to complete the reaction under average conditions.

New methods for the commercial production of peracetic acid, as recently announced, now make the epoxyaldehyde derivatives required for this invention readily available. Thus, the process of this invention is particularly atractive as a commercial method for producing valuable vicinal diketones. An example of the use of vicinal diketones as chemical intermediates is the reaction of these compounds with ethylene diamine to produce piperazine derivatives. These latter derivatives are widely used to manufacture tranquilizing drugs and deworming agents.

The following examples illustrate particular embodiments of this invention.

EXAMPLE 1

A mixture containing acetic anhydride (217 grams, 2.125 moles) and 0.34 gram of an equimolar mixture of boric acid and oxalic acid as catalyst was prepared. To this mixture 2-ethylcrotonaldehyde (139 grams, 1.417 moles) was added continuously over a period of thirty-five minutes. The solution was stirred constantly and cooled somewhat to maintain a temperature of 30° C. The reaction mixture was allowed to stand for an additional twenty hours, after which time the catalyst was neutralized with sodium acetate (0.93 gram). The neutralized reaction mixture was fractionated to produce 2-ethyl-2-butene-1,1-diol diacetate (212 grams) having a boiling point of 88°–90° C. at a pressure of 4 millimeters of mercury, and $n_D^{30}$ 1.4339.

*Analysis.*—Calc. for ($C_{10}H_{16}O_4$): C, 60.0; H, 8.0. Found: C, 60.6; H, 8.2.

EXAMPLE 2

To 2-ethyl-2-butene-1,1-diol diacetate (200 grams, 1.0 mole) there was added 396 grams of a 23 weight percent peracetic acid solution in ethyl acetate. The total amount of peracetic acid added was 91.2 grams or 1.2 mole. The temperature of the reaction mixture was maintained at a temperature of 60° C. for a total reaction time of four hours. The reaction mixture was stirred throughout the entire reaction. After the reaction period, the reaction mixture was cooled to room temperature and fed into ethylbenzene refluxing at a pressure of 30 to 40 millimeters of mercury. Low boiling materials were removed from the refluxing mixture. Fractionation of the residue yielded 2,3-epoxy-2-ethylbutane-1,1-diol diacetate (119 grams) having a boiling point of 95°–96° C. at a pressure of 3 millimeters of mercury, and $n_D^{30}$ 1.4289. The product obtained was 55% of the theoretical yield.

*Analysis.*—Calc. for ($C_{10}H_{16}O_5$): C, 55.6; H, 7.4. Found: C, 55.5; H, 7.4.

EXAMPLE 3

To a mixture containing acetic anhydride (153 grams, 1.5 moles) and 0.227 gram of an equimolar mixture of boric acid and oxalic acid as catalyst, 2-ethyl-3-propyl-acrolein (126 grams, 1.0 mole) was added over a period of three hours. The temperature of the reaction mixture was maintained at 24°–30° C. during the addition and for nineteen additional hours after completion of aldehyde addition. The catalyst was then reduced with sodium acetate (0.62 gram) and the reaction mixture was fractionated to provide 2-ethyl-2-hexene-1,1-diol diacetate (175 grams) having a boiling point of 91°–95° C. at a pressure of 2 millimeters of mercury, and $n_D^{30}$ 1.4366.

*Analysis.*—Calc. for ($C_{12}H_{20}O_4$): C, 63.2; H, 8.8. Found: C, 63.5; H, 8.8.

EXAMPLE 4

Over a period of four hours, 927 grams of a 24 weight percent peracetic acid solution in ethyl acetate was continuously added to 2-ethyl-2-hexene-1,1-diol diacetate (551 grams, 2.417 moles). The amount of peracetic acid added was 223 grams or 2.924 moles. The reaction temperature was maintained at 65°–70° C. during the peracetic acid addition. The reaction mixture was vigorously stirred during the entire period of seven hours. Titration for peracetic acid indicated that more than the theoretical amount of peracetic acid had been consumed. The reaction mixture was then cooled to room temperature and fed into ethylbenzene refluxing at a pressure of 30–40 millimeters of mercury. Ethylbenzene, acetic acid and ethyl acetate were removed leaving a residue which was fractionated. After the fractionation 2,3-epoxy-2-ethyl-hexene-1,1-diol diacetate (425 grams) was obtained having a boiling point of 102°–103° C. at a pressure of 1.25 millimeters of mercury, and $n_D^{30}$ 1.4308.

*Analysis.*—Calc. for ($C_{12}H_{20}O_5$): C, 59.0; H, 8.2. Found: C, 59.2; H, 7.9.

EXAMPLE 5

A solution of hydroquinone inhibitor (1 gram) and 2-methallylidene diacetate (86 grams, 0.5 mole) was stirred at a temperature of 75°–80° C. while 193 grams of 23.7% peracetic acid in ethyl acetate solution (0.6 mole) were fed over a period of forty-five minutes. After a reaction period of six hours at a temperature of 75°–80° C., a test sample indicated that all of the peracetic acid had been consumed. The solution was vacuum stripped to a kettle temperature of 40° C. and a pressure of 5 millimeters of mercury to obtain 2,3-epoxy-2-methylpropane-1,1-diol diacetate having $n_D^{30}$ 1.4194 and a specific gravity of 1.132 at 20° C. The yield of crude product (95 grams) was 100% based on 2-methallylidene diacetate.

The residue product described above was mixed with 370 grams of 10% sulfuric acid and refluxed through a decanter for one and one-third hours. A yellow oil (20 grams) was collected which contained 79% 2,3-butanedione as determined by mass spectrographic analysis. The distillation was continued for an additional thirty minutes and a yellow homogeneous distillate (110 grams) was recovered which was 7.6% 2,3-butanedione as determined by mass spectrographic analysis. The overall yield of 2,3-butanedione was 56% based on 2-methallylidene diacetate.

EXAMPLE 6

A. A solution of hydroquinone inhibitor (1 gram) and 2-methallylidene diacetate (267 grams, 1.55 moles) was stirred at a temperature of 75°–80° C. while 597 grams of 23.7% peracetic acid in ethyl acetate solution (1.86 moles) were fed over a period of seventy-five minutes. After heating for two hours at a temperature of 75°–85° C., the mixture was fractionated under reduced pressure to obtain pure 2,3-epoxy-2-methylpropane-1,1-diol diacetate having the following properties: Boiling point 86° C. at a pressure of 1 millimeter of mercury; $n_D^{30}$ 1.4212; specific gravity of 1.151 at 20° C.; and 100.5% purity by analytical saponification.[1] The assigned structure was supported by infrared absorption spectrum. The yield and efficiency was 61% based on 2-methallylidene diacetate.

*Analysis.*—Calc. for ($C_8H_{12}O_5$): C, 51.0; H, 6.4. Found: C, 50.8; H. 6.5.

B. A mixture of pure 2,3-epoxy-2-methylpropane-1,1-diol diacetate (144 grams, 0.765 mole) and 486 grams of 15% sulfuric acid solution was refluxed through a decanter for one hundred and ten minutes. A yellow oil layer (55 grams) was recovered which was 89.9% 2,3-butanedione by mass spectrographic analysis. The distillation was continued for an additional fifteen minutes, and an homogeneous distillate (94 grams) was recovered which was 8.2% 2, 3-butanedione by mass spectrographic analysis. The total yield of 2,3-butanedione was 87% based on the epoxy diacetate.

EXAMPLE 7

A. A solution of hydroquinone inhibitor (1 gram) and 2-methallylidene diacetate (474 grams, 2.75 moles) was stirred at 75°–80° C. while 1327 grams of 18.9% peracetic acid in ethyl acetate solution (3.3 moles) were fed over a period of three hours and twelve minutes. After a reaction period of one and one-half hours at 80°–90° C., a test sample indicated that all of the peracetic acid had been consumed. The reaction mixture was vacuum stripped to a kettle temperature of 50° C. at a pressure of 8 millimeters of mercury and a quantative yield of crude 2,3-epoxy-2-methylpropane-1,1-diol diacetate was obtained which had the following properties: $n_D^{30}$ 1.4211 and a specific gravity of 1.126 at 20° C.

B. A mixture of 94 grams of the crude epoxydiacetate and 333 grams of 15% sulfuric acid was refluxed through a decanter for two hours. A yellow oil layer (20 grams) was separated which contained 55% 2,3-butanedione. The distillation was continued and a yellow homogeneous distillate (69 grams) was recovered which contained 8% 2,3-butanedione. The overall yield of 2,3-butanedione was 38% based on 2-methallylidene diacetate.

EXAMPLE 8

A mixture of 94 grams of the crude epoxydiacetate product described in Example 7 and 293 grams of 15% hydrochloric acid was refluxed through a decanter for two hours. A yellow oil layer (4 grams) was recovered which contained 45% 2,3-butanedione. The distillation was continued and a homogeneous distillate (76 grams) was recovered which contained 5.6% 2,3-butanedione. The overall yield of 2,3-butanedione was 14% based on 2-methallylidene diacetate.

EXAMPLE 9

A mixture of 94 grams of the crude epoxydiacetate product described in Example 7 and 505 grams of 15% phosphoric acid were refluxed through a decanter for one hour. Since only 1 gram of yellow oil was collected, 89 grams of 85% phosphoric acid was added and the refluxing was resumed for an additional three hours. A total of 18 grams of yellow oil were collected which contained 62% 2,3-butanedione. The distillation was continued

[1] Percentage results slightly higher than one hundred are not unusual for some analytical procedures.

and a yellow homogeneous distillate (69 grams) was recovered which contained 6.8% 2,3-butanedione. The overall yield of 2,3-butanedione was 37% based on 2-methallylidene diacetate.

EXAMPLE 10

Portions of the crude epoxydiacetate product described in Example 7 were mixed with 10 parts by weight of water and heated in stainless steel rocker bombs. The 2,3-butanedione product formed was distilled from the reaction mixtures as previously described. The results are recorded in Table I.

Table I

| Run No. | Temp., °C. | Time, Minutes | Yield 2,3-butanedione,[1] percent |
| --- | --- | --- | --- |
| 1 | 160 | 60 | 5 |
| 2 | 200 | 15 | 20 |
| 3 | 250 | 30 | 13 |

[1] Based on 2-methallylidene diacetate.

EXAMPLE 11

A solution of hydroquinone inhibitor (0.5 gram) and 2-methallylidene diacetate (160 grams, 0.93 mole) was stirred at a temperature of 70°–75° C. while 360 grams of 23.6% peracetic acid in ethyl acetate (1.12 moles) were fed over a period of thirty-five minutes. After a reaction period of five hours at a temperature of 75°–80° C., the solution was vacuum stripped to a kettle temperature of 40° C. at a pressure of 5 millimeters of mercury. A colorless epoxydiacetate residue product (201 grams) was recovered which had $n_D^{30}$ 1.4155 and contained some free acetic acid.

The residue product was divided into two equal portions and each was mixed with 8 parts by weight of water and heated in stainless steel rocker bombs. The 2,3-butanedione produced was distilled from the reaction mixtures as previously described. The results are recorded in Table II.

Table II

| Run No. | Temp., °C. | Time, Minutes | Yield 2,3-butanedione,[1] percent |
| --- | --- | --- | --- |
| 1 | 200 | 60 | 35 |
| 2 | 250 | 30 | 11 |

[1] Based on 2-methallylidene diacetate.

EXAMPLE 12

A mixture of 2-(1-methyl-1,2-epoxyethyl)-1,3-dioxolane (48 grams, 0.37 mole) and 370 grams of 10% sulfuric acid was refluxed through a decanter for one hundred and forty minutes. A yellow oil layer (23 grams) was separated which contained 94.6% 2,3-butanedione as determined by mass spectrographic analysis. The distillation was continued for an additional twenty minutes and an homogeneous distillate (51 grams) was recovered which was 9.8% 2,3-butanedione as determined by mass spectrographic analysis. The total yield of 2,3-butanedione was 84% based on the epoxy acetal.

EXAMPLE 13

A mixture of 2-ethyl-2,3-epoxybutane-1,1-diol diacetate (98 grams, 0.45 mole) and 486 grams of 15% sulfuric acid was refluxed through a decanter for three hours. A yellow oil layer (31 grams) was separated. This oil was fractionated to obtain pure 3,4-hexanedione having the following properties: Boiling point 58° C. at a pressure of 50 millimeters of mercury; $n_D^{30}$ 1.4058; a specific gravity of 0.944 at 20° C.; and 98.7% purity by hydroxylamine carbonyl analysis. The total yield of 3,4-hexanedione was 60% based on the epoxydiacetate.

Analysis.—Calc. for $(C_6H_{10}O_2)$: C, 63.1; H, 8.8. Found: C, 62.5; H, 9.2.

EXAMPLE 14

A mixture of 2,3-epoxy-2-ethyl-1,1-hexanediol diacetate (195 grams, 0.8 mole) and 740 grams of 10% sulfuric acid was refluxed through a decanter for four hours and twelve minutes. A yellow oil layer (72 grams) was separated. This oil was fractionated to yield pure 3,4-octanedione having the following properties: Boiling point 42° C. at a pressure of 6 millimeters of mercury; $n_D^{30}$ 1.4205; a specific gravity of 0.913 at 20° C.; and 99.8% purity by hydroxylamine carbonyl analysis. The assigned structure was confirmed by infrared absorption spectrum and by mass spectographic studies. The total yield of 3,4-octanedione was 52% based on the epoxydiacetate.

Analysis.—Calc. for $(C_8H_{14}O_2)$: C, 67.6; H, 9.9. Found: C, 67.2; H, 9.5.

EXAMPLE 15

A mixture of 2-(1-ethyl-1,2-epoxypentyl)1,3-dioxolane (74 grams, 0.4 mole) and 370 grams of 10% sulfuric acid were refluxed through a decanter for six hours. A yellow oil layer (38 grams) was separated. Hydroxylamine carbonyl analysis of the oil indicated that it contained 30 grams of 3,4-octanedione which corresponded to a yield of 53% based on the epoxy acetal.

What is claimed is:

1. A method of synthesizing vicinal diketones which comprises heating in an aqueous acid medium at a temperature in the range between 50° and 280° C. a compound having the formula:

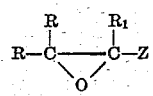

wherein R is selected from the group consisting of hydrogen and lower alkyl; $R_1$ is a lower alkyl substituent; and Z is selected from the group consisting of:

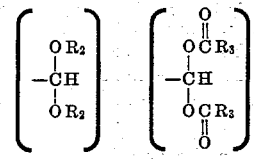

and

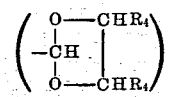

wherein $R_2$ is alkyl, $R_3$ is lower alkyl and $R_4$ is from the group consisting of hydrogen and lower alkyl.

2. A method of synthesizing 2,3-butanedione which comprises heating 2,3-epoxy-2-methylpropane-1,1-diol diacetate in an aqueous acid medium at a reaction temperature in the range between 50° and 280° C.

3. A method of synthesizing 2,3-butanedione which comprises heating 2-(1-methyl-1,2-epoxyethyl)-1,3-dioxolane in an aqueous acid medium at a reaction temperature in the range between 50° and 280° C.

4. A method of synthesizing 3,4-hexanedione which comprises heating 2-ethyl-2,3-epoxybutane-1,1-diol diacetate in an aqueous acid medium at a reaction temperature in the range between 50° and 280° C.

5. A method of synthesizing 3,4-octanedione which comprises heating 2,3-epoxy-2-ethyl-1,1-hexanediol diacetate in an aqueous acid medium at a reaction temperature in the range between 50° and 280° C.

References Cited in the file of this patent

UNITED STATES PATENTS

| 2,106,347 | Groll et al. | Jan. 25, 1938 |
| 2,600,766 | Hearne et al. | June 17, 1952 |

OTHER REFERENCES

Wagner et al.: Synthetic Organic Chemistry, pp. 172, 254–5, 287 (1953).